3,324,056
COPOLYMER EMULSION OF LOWER ALKYL ESTERS AND DIALKYL ESTERS
Joseph Albert Vona, Westfield, and William Basil Horback, Irvington, N.J., assignors to Celanese Corporation, a corporation of Delaware
No Drawing. Filed Nov. 1, 1963, Ser. No. 320,942
12 Claims. (Cl. 260—17)

This invention relates broadly to copolymer emulsions and to a method of preparing the same. More particularly it is concerned with emulsions of multi-component, more particularly three-component, interpolymers (i.e., terpolymers). Still more particularly it is concerned with such emulsions which are stable and have a high solids content, and wherein the copolymer is insoluble in water, internally plasticized and film-forming. The emulsions of this invention may be pigmented or non-pigmented. They provide emulsion paints with excellent freeze-thaw stability characteristics, and yield films having a very high resistance to scrubbing.

Various emulsions of binary and ternary thermoplastic copolymers or interpolymers heretofore have been employed or suggested for use as paint or coating compositions, in adhesive applications, and for other purposes. Such copolymers as those obtained by copolymerization of vinyl chloride with other monomeric materials including methyl acrylate, vinyl acetate, diethyl fumarate or vinylidene chloride have been proposed for this purpose; also, terpolymers of vinyl toluene, acrylic acid and methyl acrylate; and many others. As is well known to those skilled in the art of polymerization, it cannot be predicted with any reasonable certainty what properties will be possessed by the polymer resulting from copolymerization or interpolymerization of varying proportions of different copolymerizable materials, and this is especially true with respect to emulsion-polymerized monomeric mixtures. Hence the use of polymeric emulsions as paints and the like has necessitated extensive research to develop emulsion and paint compositions of this type for particular service applications.

The problem is an extremely difficult one and, also, highly important since the useful properties of emulsion paints are mostly dependent upon the properties of the emulsion including the polymeric component. Prior attempts to solve the problem generally have resulted in an improvement in one or more of the useful properties but only by sacrificing other useful properties. For example, an emulsion formulation or recipe that resulted in an improvement in freeze-thaw characteristics of the emulsion would show a decrease in the scrub-resistance of dried films of paint prepared from the emulsion. Similarly, an emulsion formulation yielding an emulsion from which could be made a paint that gave dried films having improved scrub resistance would show decreased freeze-thaw properties of the emulsion and/or of paints prepared therefrom. Or, the emulsions resulting from prior attempts to solve the problem of making a superior product would not be sufficiently stable as to dispersion, pH and/or viscosity; or would be too sensitive to the effect of metal ions; or dried films of the emulsion or of paints made therefrom would not be sufficiently water-resistant, or have the desired clarity, or adequate flexibility, or resistance to heat discoloration.

A superior emulsion paint requires that the aforementioned useful properties, especially both the freeze-thaw characteristics of the paint (also, of the emulsion) and the scrub-resistance (so-called "scrubability") of the dried films, be optimized without decrease in one or another or all of the other useful properties.

The present invention is a solution to the above-described problem. It is based on our discovery of an emulsified composition produced in a particular way from critical proportions of certain copolymerizable materials and which has a unique and unobvious combination of properties that make both the emulsion and films thereof eminently suitable for a wide variety of service applications. The compositions of this invention comprise an emulsion containing: (1) a copolymer (interpolymer) comprised of the following copolymerizable ingredients in the following weight proportions:

(a) From 60 to 90% of a lower aliphatic ester, having terminal ethylenic unsaturation, of a lower saturated aliphatic monocarboxylic acid;
(b) From 5 to 25% of a $C_1$–$C_8$ alkyl ester (i.e., an ester having from 1 through 8 carbon atoms in the alkyl grouping) of an alpha,beta-ethylenically unsaturated lower aliphatic monocarboxylic acid;
(c) From 5 to 15% of a di-($C_2$–$C_8$ alkyl) ester (i.e., a dialkyl ester wherein each alkyl grouping thereof contains from 1 through 8 carbon atoms) of at least one dicarboxylic acid selected from the group consisting of maleic and fumaric acids. For example, this diester may be one where the alkyl moieties in the ester grouping are ethyl, butyl or octyl moieties;

and (2) from 2 to 12% by weight, based on the total weight of the aforementioned copolymerizable ingredients, of a "water-soluble" (within which term is included water-miscible), nonionic surfactant (emulsified), e.g., a nonylphenoxy (polyethoxy) ethanol.

The emulsion also may contain a small amount of a protective colloid, more particularly a nonionic hydrophilic protective colloid. The amount of such a colloid may range, for example, from about 0.1% to about 2%, and more particularly from about 0.50% to about 1%, by weight of the total weight of monomers charged. Illustrative examples of useful nonionic protective colloids are water-soluble methyl and ethyl celluloses, hydroxyethyl cellulose, hydroxyethyl ethers of cellulose, polyvinyl alcohols including those containing acetate groups (e.g., up to about 10% acetate groups), polyacrylamide, polyvinylpyrrolidone, gum arabic, gum tragacanth, water-soluble alginates, casein, etc. Especially suitable for use in practicing this invention are the hydroxyethyl ethers of cellulose.

The emulsions of this invention preferably are those wherein the thermoplastic polymeric component comprises or consists essentially of the ingredients of (a), (b) and (c), supra, but differing therefrom in that the weight proportions of the ester of (a) are from 70 to 80%; of (b), from 10 to 25%; and of (c), from 5 to 10%.

The aqueous emulsion of the above-described ternary polymer, which is water-insoluble, is produced by a process which comprises dispersing the comonomers of which the said polymer (copolymer) is formed in water in the presence of from 2 to 12% by weight, based on the total weight of the said comonomers, of a water-soluble nonionic surfactant. As indicated above, a nonionic protective colloid also may be present. These comonomers are those defined and are employed in the weight proportions broadly set forth under (a), (b) and (c), supra, and more specifically in the preceding paragraph. After adding a polymerization catalyst to the resulting dispersion, the catalyzed reaction mass is heated at from about 40° C. to about 90° C. Preferably polymerization is effected by heating the dispersion of monomers below about 80° C., more particularly at from 65° C. to 75° C. If temperatures above about 80° C. (e.g., up to about 90° C.) are employed, it is usually for only a relatively short period of time (so-called "finishing" time), e.g., up to about 20 or 25% of the total period of reaction. Such a "finishing" time assures maximum conversion of the dispersed monomers to polymeric material.

The emulsions may be prepared continuously, semi-continuously or by batch technique. The time of reaction will vary widely depending upon the particular equipment employed (e.g., continuous, semi-continuous or batch equipment), size of the total charge, particular monomers and other additives employed, particular viscosity and other properties desired, and other influencing factors. For example, the reaction time may vary from 2 to 8 hours or more.

The emulsions of the invention generally contain from about 45% to about 60% by weight of solids.

In order that those skilled in the art may better understand how the present invention can be carried into effect, the following examples are given by way of illustration and not by way of limitation. The examples are given in tabulated form in the following table, after which details of the preparation of a typical emulsion are given.

To the aqueous phase resulting from the above additions was added 10% of the total weight of monomers to be added, i.e., 41.46 grams vinyl acetate, 9.95 grams ethyl acrylate and 3.87 grams dioctyl maleate. (The dioctyl maleate employed in the examples was, specifically, di-2-ethylhexyl maleate.) After thorough mixing of the reaction mass, the initial aqueous solution of dissolved catalyst was charged, and the vessel was heated slowly until the agitated mass reached a temperature of 80° C. This required one-half hour.

When the reaction temperature reached 80° C., the premixed delayed monomer addition (equivalent to 90% of the total charge of monomers) and the delayed catalyst addition (50% of the total catalyst charge) were added incrementally over a 2-hour period while maintaining the reaction temperature at 80° C. by means of a hot water bath. After the addition of the delayed charge of monomers and catalyst, the reaction temperature was increased to 90° C. and maintained at this temperature

TABLE

| Example No. | 1 | 2 | 3 | 4 |
| --- | --- | --- | --- | --- |
| Water, g | 464 | 464 | 464 | 464 |
| Igepal CO-977, g./% on wt. of monomers [1] | 36/4.5 | 24.9/3.15 | 30/3.8 | 30/3.8 |
| Igepal CO-630, g./% on wt. of mons | 6.5/1.2 | 4.5/0.81 | 9.4/1.7 | 5.5/1.0 |
| Terigtol NP-14, g./% on wt. of mons | 4.3/0.8 | 3.0/0.54 | | 3.9/0.7 |
| Vinyl Acetate, g./% on wt. of monomers | 414.6/75 | 414.6/75 | 414.6/75 | 414.6/75 |
| Ethyl Acrylate, g./% on wt. of mons | 99.5/18.0 | 99.5/18 | 99.5/18 | 82.5/15 |
| Dioctyl Maleate, g./% on wt. of monomers | 38.7/7.0 | 38.7/7.0 | 38.7/7.0 | 55.3/10 |
| Dibutyl Maleate, g./%, on wt. of mons | | | | |
| Dioctyl Fumarate, g./%, on wt. of mons | | | | |
| Cellosize WP-09, g./%, on wt. of monomers | 8.25/1.25 | 8.25/1.25 | 8.25/1.25 | 8.25/1.25 |
| Nopco NDW, g | 1.0 | 1.0 | 1.0 | 1.0 |
| Sodium Bicarbonate, g | 1.0 | 1.0 | 1.0 | 1.0 |
| Potassium Persulfate, g | 2.5 | 2.5 | 2.5 | 2.5 |

[1] 70% aqueous solution of Igepal CO-970.

Details of the preparation of the emulsions set forth in the table are exemplified by the following description of the preparation of the emulsion of Example 1:

Four hundred and sixty-four (464) grams of water was accurately weighed, and a 50-gram aliquot was used to dissolve 1.25 grams (50%) of a polymerization catalyst, specifically potassium persulfate, while another 50-gram aliquot was employed to dissolve the remaining 2.5 grams of catalyst. One portion of the dissolved catalyst was used initially while the other was employed later as a delayed addition. Another 100-gram aliquot of water was used to dissolve all of the Cellosize WP-09, which is a nonionic, hydrophilic, protective colloid. Chemically, it is a water-soluble hydroxyethyl ether of cellulose. When the Cellosize WP-09 had completely dissolved, the resulting solution was charged, with the remaining unused water, to a reaction vessel provided with a reflux condenser and agitating means.

The reaction vessel was then charged with 36 grams Igepal CO-977 (a 70% aqueous solution of Igepal CO-970), 6.5 grams of CO-630 and 4.3 grams of Tergitol NP-14. These additives are nonionic emulsifiers. Chemically, they are nonylphenoxy (polyethoxy) ethanols having varying amounts of ethylene oxide combined therein. Thus, based on the weight of nonylphenol employed in their preparation, Igepal CO-930 has an average of about 97% combined ethylene oxide therein; Igepal CO-630 has an average of about 63% combined ethylene oxide therein; and Tergitol NP-914 has an average of about 43% ethylene oxide combined therein.

Under agitation, the aforementioned nonylphenoxy (polyethoxy) ethanols were dissolved, after which 1.0 gram of Nopco NDW (a defoaming agent produced and sold by Nopco Chemical Company, Newark, N.J.) and 1.0 gram of sodium bicarbonate (as a buffering agent) were added to the reaction vessel.

for one-half hour to assure a good conversion yield. A conversion of 99.8% was obtained.

The pH of the emulsion was 4.4 and its viscosity was 1744 cps. The emulsion satisfactorily passed four freeze-thaw cycles, and the paint prepared utilizing this emulsion also satisfactorily passed four freeze-thaw cycles. (One cycle is exposure for 16 hours at − 10° C. followed by 8 hours of thawing at room temperature.)

A dried film of a paint prepared from the above-described emulsion, when tested for its scrub-resistance, gave 830 scrubs. In marked contrast, a dried film of a paint prepared from a similarly prepared emulsion of a copolymer of 80% vinyl acetate and 15% ethyl acrylate, and in which was incorporated 5% dibutyl phthalate, gave only 400 scrubs. The dibutyl phthalate does not interpolymerize with the other two monomers.

In determining scrub-resistant properties a Gardner Heavy-Duty Wear Tester was employed. The tests were run using a commercially available cleanser (Bon-Ami) and water. The cleanser was applied originally to the test panel and subsequently after every 100 cycles, while water was applied originally and after every 35 cycles.

The properties of the emulsions of the other examples in the table, and of paints prepared therefrom and of dried films deposited from the paints, were similar to those of Example 1 which has been described above in more detail.

It will be understood, of course, by those skilled in the art that the present invention is not limited to the specific ingredients, proportions thereof, temperature and time of reaction, the order of addition of the ingredients, and other operating conditions given in the foregoing examples by way of illustration.

Thus instead of using potassium persulfate as a polymerization catalyst one may use any other free-radical catalyst or catalyst system, with or without other catalytic influences. The chosen catalyst should function effectively at the reaction temperature employed and, in an aqueous system, should be at least partly soluble in water and/or in the monomeric mixture. Preferably there is used a catalyst such as a peroxide that is at least partly soluble in water. More specific examples of peroxide catalysts that may be employed are hydrogen peroxide, water-soluble inorganic persalts such as the persulfates, perphosphates, perborates, etc., including the alkali-metal (sodium, potassium, lithium, etc.) and ammonium perphosphates, and perborates. Organic peroxides having at least some solubility in water or in the reaction mass are also useful, e.g., acetyl peroxide, benzoyl peroxide, tertiary-butyl hydroperoxide and others of similar characteristics.

The amount of polymerization catalyst employed may be widely varied, e.g., from 0.5 to 5%, more particularly from about 1 to about 2% by weight of the total weight of copolymerizable monomers. Obviously, no more catalyst should be used than is required to obtain maximum conversion at lowest catalyst cost.

Instead of the particular water-soluble nonionic surfactants employed in the foregoing examples, other such surfactants may be employed. Typical emulsifiers (surfactants) that may be used include other alkylphenoxy (polyethoxy) ethanols such as those having attached to the aromatic nucleus alkyl groups containing 7, 8 or 10 through 12 carbon atoms; polyethoxyethanol derivatives of methylene-linked alkylphenols; sulfur-containing agents such as those made by condensing the required proportion of ethylene oxide with nonyl, dodecyl, tetradecyl, etc., mercaptans or with alkylthiophenols having alkyl groups of from 6 to 15 carbon atoms; ethylene oxide derivatives of long-chain carboxylic acids such as lauric, myristic, palmitic, oleic, etc., or mixtures of acids such as those present in tall oil; ethylene oxide condensates of long-chain alcohols such as octyl, decyl, lauryl or cetyl alcohols; ethylene oxide derivates of etherified or esterified polyhydroxy compounds having a hydrophobic hydrocarbon chain; etc.

Instead of vinyl acetate one may use (alone or preferably with vinyl acetate) other lower aliphatic esters, having terminal ethylenic unsaturation, of a lower, saturated aliphatic, monocarboxylic acid, e.g., the vinyl esters of propionic, butyric and valeric acids. The use of allyl esters of acetic, propionic, butyric and valeric acids, especially when a small amount thereof is employed in conjunction with a larger amount of vinyl acetate, is not precluded.

Instead of ethyl acrylate one may employ other $C_1$–$C_8$ alkyl esters of an alpha,beta-ethylenically unsaturated, lower aliphatic, monocarboxylic acid (alone or preferably a small amount in conjunction with ethyl acrylate) e.g., the methyl and the propyl through octyl esters of acrylic acid, and the methyl through octyl esters of alpha-methyl through alpha-pentyl-substituted acrylic acids, and the corresponding alkyl esters of alpha-phenyl-acrylic acid.

Instead of dibutyl maleate, dioctyl maleate or dioctyl fumarate employed in the illustrative examples, one may use other di-($C_2$–$C_8$ alkyl) esters of either fumaric acid or maleic acid or of both such acids, e.g., diethyl maleate, dipropyl maleate, the diamyl through diheptyl esters of maleic acid, the diethyl through diheptyl esters of fumaric acid, and the unsymmetrical di-($C_2$–$C_8$ alkyl) esters of maleic and fumaric acids such as butyl octyl maleate, amyl octyl fumarate, hexyl octyl maleate, butyl hexyl maleate, and the like.

The embodiments of the invention in which an exclusive property or privilege is claimed are as follows:

1. Emulsion of (1) a copolymer consisting essentially of, as the sole copolymerized ingredients in the following weight proportions:
  (a) from 60 to 90% of a lower aliphatic ester, having terminal ethylenic unsaturation, of a lower saturated aliphatic monocarboxylic acid,
  (b) from 5 to 25% of a $C_1$–$C_8$ alkyl ester of an alpha, beta-ethylenically unsaturated lower aliphatic monocarboxylic acid, and
  (c) from 5 to 15% of a di-($C_2$–$C_8$ alkyl) ester of at least one dicarboxylic acid selected from the group consisting of maleic and fumaric acids; and
(2) from 2 to 12% by weight, based on the total weight of the aforementioned copolymerizable ingredients, of a water soluble nonionic surfactant.

2. An emulsion as in claim 1 wherein the weight proportions of the ester of (a) are from 70 to 80%; of (b), from 10 to 25%; and of (c), from 5 to 10%.

3. An emulsion as in claim 1 wherein the ester of (a) is vinyl acetate, the ester of (b) is a $C_1$–$C_8$ alkyl acrylate, and the diester of (c) is one wherein the alkyl moieties in the ester grouping are selected from the group consisting of ethyl, butyl and octyl.

4. An emulsion as in claim 3 wherein the ester of (b) is ethyl acrylate.

5. An emulsion as in claim 1 wherein the surfactant of (2) is at least one nonylphenoxy (polyethoxy) ethanol.

6. An emulsion as in claim 1 which additionally contains a small amount of a hydrophilic, nonionic, protective colloid.

7. An emulsion as in claim 6 wherein the protective colloid is a water-soluble hydroxyethyl ether of cellulose.

8. The process of producing an emulsion of a water-insoluble copolymer which comprises dispersing the comonomers of which the said copolymer is formed in water in the presence of from 2 to 12% by weight, based on the total weight of said comonomers, of a water-soluble nonionic surfactant, and the aforesaid comonomers being those defined and being employed in the weight proportions set forth under (a), (b) and (c) of claim 1; adding a polymerization catalyst to the resulting dispersion; and heating the catalyzed reaction mass at a temperature ranging from about 40° C. to about 90° C.

9. A process as in claim 8 wherein the polymerization catalyst is a persulfate.

10. A process as in claim 8 wherein the water-soluble nonionic surfactant comprises at least one nonylphenoxy (polyethoxy) ethanol.

11. A process as in claim 8 wherein the comonomers are dispersed in the presence of, additionally, a nonionic hydrophilic protective colloid.

12. A process as in claim 11 wherein the protective colloid comprises a water-soluble hydroxyethyl ether of cellulose.

References Cited

UNITED STATES PATENTS 3,003,987  10/1961  Hager et al. _____ 260—29.6

OTHER REFERENCES

Cogan: "Use of Acrylic Esters in Copolymer Latexes," Official Dig., March 1961, pages 365–379.

WILLIAM H. SHORT, *Primary Examiner.*

J. NORRIS, *Assistant Examiner.*